Patented Sept. 8, 1953

2,651,641

UNITED STATES PATENT OFFICE 2,651,641

1,8-DIHYDROXY-5-NITRO-4-METHYLOLANI- LINOANTHRAQUINONE COMPOUNDS AND PROCESS FOR THEIR PREPARATION

James M. Straley and Joseph B. Dickey, Kingsport, Tenn., assignors to Eastman Kodak Company, Rochester, N. Y., a corporation of New Jersey No Drawing. Application January 16, 1951, Serial No. 206,304

8 Claims. (Cl. 260—380)

This invention relates to new anthraquinone compounds and their application to the art of dyeing or coloring. More particularly it relates to new anthraquinone dyestuffs which color textile materials made of or containing a cellulose alkyl carboxylic acid ester having two to four carbon atoms in the acid groups thereof, especially cellulose acetate textile materials, blue to greenish-blue shades. The invention is also directed to a process for preparing the new anthraquinone compounds.

So far as applicants are aware, no commercially available dyestuffs having a satisfactory degree of affinity for cellulose acetate textile materials color these materials in desirable blue shades which have satisfactory fastness with respect to both light and gas. Anthraquinone dyestuffs are available which color cellulose acetate textile materials blue shades which have reasonably satisfactory fastness to light but which leave much to be desired with respect to their resistance to gas fading. Similarly, azo dyestuffs are available which color cellulose acetate textile materials blue shades which have excellent resistance to gas fading but which leave much to be desired with respect to their fastness to light.

As just indicated, the known anthraquinone dyestuffs which have satisfactory affinity for cellulose acetate textile materials and which color these materials blue shades having reasonably satisfactory fastness to light leave much to be desired with respect to their resistance to gas fading. On prolonged exposure to burnt gas fumes or to ordinary city atmosphere conditions the dyeings obtained on cellulose acetate textile materials with these dyes undergo disagreeable color changes and/or a loss of strength. Depending upon the particular dyestuff, the dyeing may change from a blue shade to a reddish-blue or even a pink color. Gas fading is also known as acid fading and the two terms, as used herein, are intended to be synonymous. Much research has been directed to the development of anthraquinone dyestuffs which dye cellulose acetate textile materials blue shades which have excellent fastness to both light and gas. However, while some progress has been made, the problem has not heretofore been solved. Efforts have been made to increase the resistance of the dyeings to gas fading by the use of inhibitors but this method is not particularly satisfactory because the application of such inhibitors is usually expensive and often inconvenient. Additionally, the effect is not permanent.

It is an object of our invention to provide new anthraquinone dyestuffs having good affinity for cellulose alkyl carboxylic acid esters having two to four carbon atoms in the acid groups thereof textile materials and dyeing said textile materials in level blue to greenish-blue shades which have excellent fastness to both light and gas. Another object is to provide a satisfactory process for the preparation of the new anthraquinone dyestuffs of the invention. A particular object is to provide new anthraquinone dyestuffs which are especially of value for the dyeing of cellulose acetate textile materials.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

We have discovered that the new 1,8-dihydroxy-5-nitro-4-methylolanilinoanthraquinone compounds having the probable general formula:

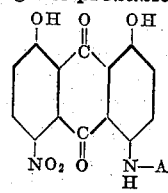

wherein A represents a monocyclic benzene nucleus containing a

group wherein R represents a hydrogen atom, a methyl group or an ethyl group are valuable dyes for coloring textile materials made of or containing a cellulose alkyl carboxylic acid ester having two to four carbon atoms in the acid groups thereof. These dye compounds when applied to the aforesaid materials give blue to greenish-blue dyeings which have outstanding light and gas fastness properties. They are particularly of use for the coloration of cellulose acetate textile materials.

The remarkable resistance of the dyestuffs of the present invention to gas fading is shown by the fact that the dyeings obtained therewith on cellulose acetate textile materials undergo very little alteration in strength or shade even after exposure to as many as 6 AATCC gas-cycles. By contrast, various aminoanthraquinones such as 1,4-dimethylaminoanthraquinone, 1-methylamino-4-methoxyethylaminoanthraquinone, 1-methylamino-4-β-hydroxyethylaminoanthraquinone, 1,4-diaminoanthraquinone, 1,4,5,8-tetraaminoanthraquinone, 1,4-di-β-hydroxyethylamino-5,8-dihydroxyanthraquinone and 1-amino-4-methylaminoanthraquinone-2 carboxylic amide, which are used extensively to color cellulose acetate textile materials, are markedly changed after only 1 AATCC gas-cycle.

Similarly the outstanding light-fastness of our new dyestuffs is apparent from the fact that the dyeings obtained therewith on cellulose acetate textile materials show little fading after 60 hours' exposure on the Fadeometer light-fastness apparatus. The significance of this will be apparent from the fact that dyeings on cellulose acetate which show little fading after 20 hours' exposure on the Fadeometer light-fastness apparatus are considered good.

We are aware that U. S. Patent 2,480,269 discloses anthraquinone dyestuffs obtained by reacting polyhydroxy polynitroanthraquinone compounds such as, for example, 4,8-dinitro-anthrarufin, 4,5-dinitro-chrysazin or 4,8-dinitro-anthrachrysone, with a primary aromatic amine such as aniline, toluidine, amino-ethylbenzene, amino-acetophenone or amino-phenol, for example. However, this patent does not disclose the dyestuffs of the present application and further the dyestuffs of the patent are inferior to the dyestuffs of the present application in at least two important respects. One, the dyestuffs of the present application have better affinity for cellulose acetate textile materials and two, they give more light-fast dyeings on cellulose acetate textile materials than do the dyestuffs of U. S. Patent 2,480,269.

The new anthraquinone dyestuffs of the invention are prepared by condensing 4,5-dinitro-1,8-dihydroxyanthraquinone, also known as 4,5-dinitrochrysazin, with an aminobenzyl alcohol having the formula:

$$H_2N—A$$

wherein A has the meaning previously assigned to it. Amines that can be used in preparing the new anthraquinone compounds of the invention include, for example, m-aminobenzyl alcohol, m-aminophenylmethylcarbinol, m-aminophenylethylcarbinol, 4-methyl-3-aminobenzyl alcohol, 4-methyl-3-aminophenylmethylcarbinol, 6-methyl-3-aminobenzyl alcohol, 6-methoxy-3-aminobenzyl alcohol, 4-methoxy-3-aminobenzyl alcohol, o-aminobenzyl alcohol, 3-chloro-4-aminophenylmethylcarbinol, p-aminobenzyl alcohol, p-aminophenylmethylcarbinol, o-aminophenylmethylcarbinol and 2,5-dimethylol aniline.

The foregoing reaction can be carried out with or without the use of a solvent or diluent which does not undergo reaction with the reactants. However, the use of a substantial amount of a solvent or diluent such as, for example, water, nitrobenzene, o-nitrotoluene, quinoline, quinaldine, amyl alcohol, ethyl alcohol, butyl alcohol, pyridine, 2-methyl-5-ethylpyridine, diphenylamine, a phenol such as phenol or m-cresol, an N,N-di-(low carbon alkyl) amide of a normal fatty acid having one to three carbon atoms such as N,N-dimethyl formamide, N,N-diethyl formamide, N,N-diisopropyl formamide, N,N-dimethyl acetamide, N,N-diethyl acetamide, N,N-dipropyl acetamide or N,N-dimethyl propionamide is preferred, as the use of such a solvent or diluent constitutes a distinct improvement from a practical viewpoint. Other diluents such as xylene and dichlorobenzene, for example, can be used, but, because of solubility factors, they do not appear to be as advantageous as the other solvents or diluents named hereinbefore, and consequently, it is preferred not to use them.

When the process is carried out using no diluent or only a small amount of diluent, or using an excess of the aminobenzyl alcohol as the diluent, it is difficult to remove the reaction product completely from the reaction vessel and the process would be very inconvenient on a commercial scale. When suitable organic solvents or diluents having a boiling point higher than that of water, such as nitrobenzene, quinoline, amyl alcohol, pyridine, 2-methyl-5-ethyl pyridine, N,N-dimethyl acetamide or N,N-dimethyl formamide, for example, are used the reaction can be carried out at a temperature higher than when water is used, thus shortening the time of reaction. The use of N,N-dimethyl acetamide or N,N-dimethyl formamide, as a solvent or diluent, appears to be especially advantageous and is preferred.

Other than selecting a temperature high enough to effect the desired reaction and not so high as to cause the formation of an appreciable amount of undesirable by-products, the exact temperature employed does not appear to be critical. Thus, temperatures ranging from about 25° C. to about 200° C. can be used although we prefer to use temperatures from 100° C. to 170° C. Ordinarily temperatures lower than about 100° C. are not used as too long a reaction time is required when such temperatures are employed.

The use of an excess of the aminobenzyl alcohol reactant appears to give improved results. A molecular ratio of about 2 mols of the amine reactant for each mol of 4,5-dinitrochrysazin has been found very satisfactory. However, it will be understood that the desired product can be obtained using either a greater or lesser proportion of the aminobenzyl alcohol reactant.

The following examples, in which parts are expressed as parts by weight, illustrate the anthraquinone compounds of our invention and the manner in which they are prepared.

*Example 1*

50 parts of 4,5-dinitro-1,8-dihydroxyanthraquinone, 40 parts of m-aminobenzyl alcohol and 300 parts of quinoline are placed in a suitable reaction vessel and heated, with stirring, at 150° C.–155° C. for 3 hours. Then the reaction mixture is cooled, poured into 700 parts of 15 per cent hydrochloric acid and filtered. The product obtained on the filter is washed with warm water until neutral and then dried at 50° C.–60° C. 56 parts of a compound having the probable formula:

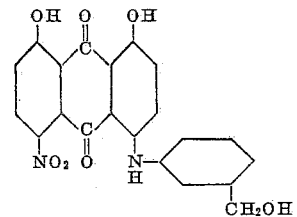

are obtained. It colors cellulose acetate textile materials bright blue shades having excellent fastness to light and gas.

*Example 2*

10 parts of m-aminophenylmethylcarbinol, and 5 parts of 4,5-dinitrochrysazin as an 80 per cent aqueous paste are placed in a suitable reaction vessel and heated, with stirring, at 125° C–130° C. for 4 to 5 hours. The reaction mixture thus obtained is poured into an aqueous 66 per cent ethyl alcohol solution and the resulting mixture is filtered. The product obtained on the filter is ground with 50 parts of 15 per cent hydrochloric acid and the mixture thus obtained is filtered. The treatment with hydrochloric acid is repeated for two more times following which the product on the filter is washed until neutral with warm water. The product thus obtained has the probable formula:

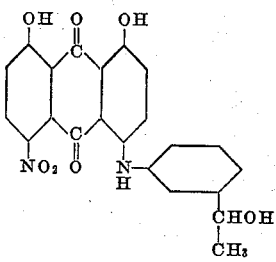

It colors cellulose acetate textile materials bright blue shades having excellent fastness to light and gas.

Example 3

10 parts of 4,5-dinitrochrysazin, 8 parts of p-aminobenzyl alcohol and 100 parts of pyridine are heated together, with stirring, in an autoclave at 145° C.–150° C. for three hours. The reaction mixture is worked up as described in Example 1 to obtain 13.5 grams of a product having the probable formula:

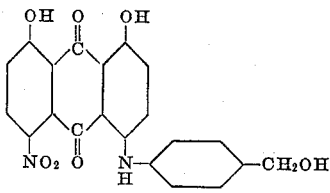

It colors cellulose acetate textile materials blue shades which have excellent fastness to light and gas.

Example 4

10 parts of 4,5-dinitrochrysazin, 8 parts of a mixture of aminobenzyl alcohols, obtained as described hereinafter, and 50 parts of nitrobenzene are heated at 160° C.–165° C. for 4 hours. The reaction mixture is cooled, diluted with 3 volumes of water, filtered and dried. The product obtained on the filter is purified with hydrochloric acid and sodium carbonate as described in Example 2. The product thus obtained colors cellulose acetate textile materials blue shades which have excellent fastness to light and gas.

Example 5

20 parts of 4,5-dinitrochrysazin, 20 parts of o-aminobenzyl alcohol and 50 parts of N,N-dimethyl acetamide are heated together, with stirring, at 120° C.–125° C. for 6 hours. The reaction mixture thus obtained is poured into 1000 parts of 5 per cent hydrochloric acid, stirred at 50° C. for 30 minutes and then filtered. The product obtained on the filter is washed with water until neutral and dried in vacuo at 50° C. 23 parts of a product which dyes cellulose acetate textile materials light and gas fast greenish-blue shades are obtained.

Example 6

20 parts of 4,5-dinitrochrysazin, 20 parts of p-aminophenylmethylcarbinol and 50 parts of N,N-dimethyl acetamide are heated together, with stirring, at 120° C.–125° C. for 6 hours. The reaction thus obtained is poured into 1000 parts of 5 per cent HCl, stirred at 50° C. for thirty minutes and then filtered. The product obtained on the filter is washed with water until neutral and dried in vacuo at 50° C. 30 parts of a product which colors cellulose acetate textile materials blue shades having excellent fastness to light and gas are obtained.

Example 7

20 parts of 4,5-dinitro-1,8-dihydroxyanthraquinone, 20 parts of o-aminophenylmethylcarbinol and 50 parts of N,N-dimethylformamide are reacted together in accordance with the procedure described in Example 6. About 30 parts of a product which colors cellulose acetate textile materials blue shades having excellent fastness to light and gas are obtained.

Example 8

20 parts of 4,5-dinitrochrysazin, 40 parts of the mixed aminobenzyl alcohols used in Example 4 and 65 parts of N,N-dimethylformamide are heated together, with stirring, at 120° C.–125° C. for 4 hours. The reaction mixture thus obtained is worked up in accordance with the procedure described in Example 5. 30 parts of a product which dyes cellulose acetate textile materials greenish-blue shades having excellent fastness to light and gas are obtained.

Example 9

10 parts of 4,5-dinitrochrysazin, 20 parts of 4-methoxy-3-aminobenzyl alcohol and 50 parts of N,N-dimethylacetamide are heated, with stirring, at 130° C.–135° C. for 4 hours. The reaction mixture thus obtained is worked up in accordance with the procedure described in Example 5. 17 parts of a product having the probable formula:

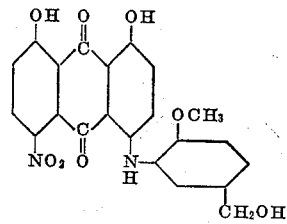

are obtained. It colors cellulose acetate textile materials blue shades which are fast to light and gas.

Example 10

10 parts of 4,5-dinitrochrysazin, and 40 parts of 3-chloro-4-aminophenylmethylcarbinol are heated together, with stirring, at 125° C.–130° C. for 5 hours. The reaction mixture thus obtained is poured into 500 parts of 60 per cent ethyl alcohol containing 20 parts of hydrogen chloride, stirred for one hour at 50° C.–60° C., diluted with an equal volume of water and filtered. The product obtained on the filter is washed well with water and dried. 13 parts of a product having the probable formula:

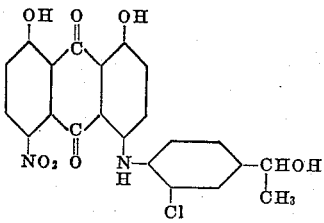

are obtained. It colors cellulose acetate textile materials blue shades which are fast to light and gas.

Example 11

10 parts of 4,5-dinitrochrysazin, 20 parts of 4-methyl-3-aminophenylmethylcarbinol and 50 parts of N,N-dimethylformamide are heated, with stirring, at 110° C.–115° C., for 4 hours. The reaction mixture thus obtained is poured into 1000 parts of 5 per cent hydrochloric acid, stirred at 50° C. for thirty minutes and then filtered. The product obtained on the filter is washed with water until neutral and dried in vacuo at 50° C. 16 parts of a product which dyes cellulose acetate textile materials blue shades which are fast to light and gas are obtained.

*Example 12*

10 parts of 4,5-dinitrochrysazin and 40 parts of m-aminophenylmethylcarbinol are heated together on the steam bath for 6 hours. The reaction mixture thus obtained is poured into 1000 parts of cold 10 per cent hydrochloric acid with good agitation and the resulting mixture is stirred for 3 hours at room temperature and filtered. The product obtained on the filter is washed with water until acid-free and then dried. 11 parts of a product identical with that of Example 2 are obtained.

*Example 13*

15 parts of 4,5-dinitrochrysazin, 15 parts of m-aminophenylethylcarbinol and 50 parts of N,N-dimethylacetamide are heated together, with stirring, at 115° C.–120° C. for 5 hours. The reaction mixture thus obtained is poured into 500 parts of 50 per cent aqueous ethyl alcohol containing 10 parts of 36 per cent hydrochloric acid and the resulting mixture is filtered. The product obtained on the filter is washed with cold 10 per cent aqueous ethyl alcohol and dried. 17 parts of a product having the probable formula:

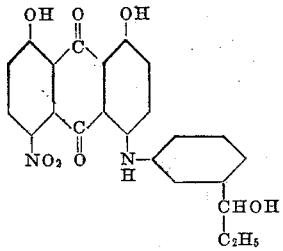

are obtained. It colors cellulose acetate textile materials greenish-blue shades which have excellent fastness to light and gas.

It will be understood that the foregoing examples are intended to be illustrative and not limitative of the compounds of the invention. Thus 2,5-dimethylol aniline and 4-aminobenzyl alcohol, for example, can be reacted with 4,5-dinitro-1,8-dihydroxyanthraquinone in accordance with the procedure described herein to obtain dye compounds of the invention.

The mixed aminobenzyl alcohols used in Examples 4 and 8 were prepared as follows:

50 grams of benzyl chloride were added at 25° C.–30° C. to a mixture of 30 grams of nitric acid (sp. gr. 1.5) and 300 cc. of acetic anhydride. The resulting mixture was stirred for 3 hours and then poured into water. A viscous oil separated and was recovered by decantation and washed with water. The water and oil fractions were separated and then the oil was dried by azeotropic distillation with CCl4. 64 grams of the viscous oil were obtained.

50 grams of the product obtained as just described, 50 grams of anhydrous sodium acetate and 100 cc. of glacial acetic acid were refluxed together for 15 hours and then poured onto ice. Sodium sulfate was added and the oil present in the reaction mixture was taken up in ethyl ether and washed acid-free with water. After drying over Na2SO4 the ether was distilled off and the oil (47.5 grams) used without further treatment. The oil, consisting of a mixture of nitrobenzyl alcohols, was reduced in a suitable pressure vessel with hydrogen at room temperature over Raney nickel at 1000 pounds per square inch in 300 cc. of ethyl alcohol. The reaction mixture thus obtained was filtered and 50 cc. of concentrated hydrochloric acid (36%) were added thereto and the resulting mixture was refluxed for 10 hours and then evaporated to a volume of 100 cc. The reaction mixture was neutralized with sodium carbonate and extracted with ethyl ether. The ether extract was dried over Na2SO4 after which the ether was removed by distillation. The thick oily residue (28 grams' yield) consisting of a mixture of aminobenzyl alcohols was used without further purification.

The 4-methoxy-3-aminobenzyl alcohol used in Example 9 was prepared as follows:

71.5 grams of 4-methoxy-3-nitrobenzaldehyde in 500 cc. of ethyl alcohol were placed in a suitable pressure vessel and hydrogenated with hydrogen over Raney nickel at 1400 to 1600 pounds per square inch at a temperature of 85° C.–100° C. Upon competion of the hydrogenation reaction the reaction mixture was evaporated to dryness and the residue was recrystallized from benzene. 32 grams of 4-methoxy-3-aminobenzyl alcohol melting at 95° C.–97° C. were obtained.

The 3-chloro-4-aminophenylmethylcarbinol used in Example 10 was prepared as follows:

60 grams of 3,4-dichloroacetophenone, 200 cc. of 29 per cent aqueous ammonia and 1 gram of CuO were heated in an autoclave at 250° C.–260° C. for 8 hours. The reaction mixture was filtered and the product obtained on the filter was washed with water until neutral and dried. 48 grams of a product melting at 118° C.–122° C. were obtained. The product thus obtained was hydrogenated with hydrogen over Raney nickel at 100° C.–105° C. in dioxane at 1200 pounds per square inch. Upon completion of the hydrogenation reaction the dioxane was distilled off leaving 42 grams of 3-chloro-4-aminophenylmethylcarbinol melting at 91° C.–94° C.

The 4-methyl-3-aminophenylmethylcarbinol used in Example 11 was obtained as follows:

40 grams of p-methylacetophenone were dissolved in 180 cc. of 96 per cent H2SO4 and the resulting solution was cooled to −20° C. Then a mixture of 36 cc. of 96 per cent H2SO4 and 28 cc. of nitric acid (sp. gr. 1.5) was added with stirring, over a period of 30 minutes while maintaining the temperature below −20° C. After 15 minutes' additional stirring the reaction mixture was poured onto ice and filtered. The product recovered on the filter was washed acid-free with water and dried. After recrystallization from dilute acetic acid 21 grams of a product melting at 52° C.–56° C. were obtained. The product thus obtained was dissolved in 50 cc. of ethyl alcohol and hydrogenated with hydrogen over Raney nickel at 110° C. at 1000 pounds per square inch. Upon completion of the hydrogenation reaction the ethyl alcohol was removed by distillation and the residue was recrystallized from toluene. 13 grams of 4-methyl-3-aminophenylmethylcarbinol melting at 61° C.–65° C. were obtained.

The m-aminophenylethylcarbinol used in Example 13 was prepared as follows:

40 grams of propiophenone were dissolved at 0° C. in 180 cc. of 96 per cent sulfuric acid and the resulting solution was cooled to −20° C.

Then a mixture of 36 cc. of 96 per cent sulfuric acid and 28 cc. of nitric acid (sp. gr. 1.5) was added, with stirring, over a period of 30 minutes while maintaining the temperature below —20° C. About 30 minutes after complete addition the mixture was allowed to come to —10° C. and then poured onto ice and filtered. The product obtained on the filter was recrystallized from dilute acetic acid. 26 grams of a product melting at 94° C.–96° C. were obtained. The product thus obtained was hydrogenated with hydrogen over Raney nickel in 50 cc. of ethyl alcohol at 110° C. and a pressure of 1200 pounds per square inch. Then the ethyl alcohol was removed by distillation and the residue was recrystallized from toluene. 19 grams of m-aminophenylethylcarbinol melting at 65° C.–68° C. were obtained.

The new anthraquinone dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C., but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.–55° C., for example, following which the temperature is raised to that selected for carrying out the dyeing operation. The temperature at which the dyeing is conducted may, of course, be varied somewhat, depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The anthraquinone compounds having the general formula:

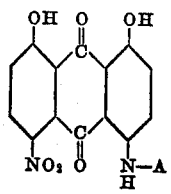

wherein A represents a monocyclic benzene nucleus containing a

group wherein R represents a member selected from the group consisting of a hydrogen atom, a methyl group and an ethyl group.

2. The anthraquinone compounds having the general formula:

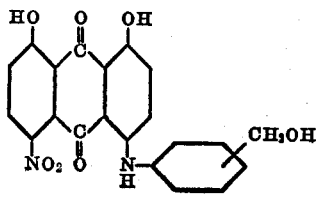

3. The anthraquinone compounds having the general formula:

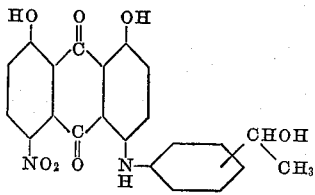

4. The anthraquinone compound having the formula:

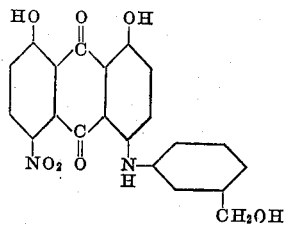

5. The anthraquinone compound having the formula:

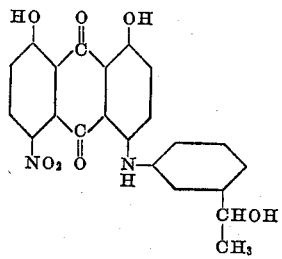

6. The anthraquinone compound having the formula:

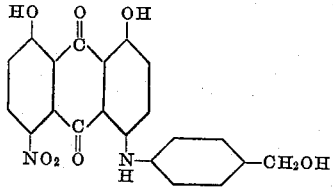

7. The anthraquinone compound having the formula:

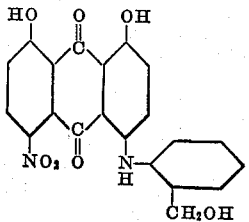

8. The anthraquinone compound having the formula:

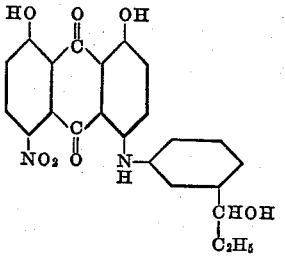

JAMES M. STRALEY.
JOSEPH B. DICKEY.

References Cited in the file of this patent

UNITED STATES PATENTS

| Number | Name | Date |
| --- | --- | --- |
| 2,053,274 | Ellis et al. | Sept. 8, 1936 |
| 2,353,108 | Wuertz et al. | July 4, 1944 |
| 2,480,269 | Seymour et al. | Aug. 30, 1949 |